United States Patent
Browning et al.

(10) Patent No.: US 7,984,848 A0
(45) Date of Patent: *Jul. 26, 2011

(54) CASH CARD SYSTEM

(76) Inventors: Lucas T. Browning, Ellicott City, MD (US); W. Clark Gaughan, Ellicott City, MD (US)

( * ) Notice: Subject to any disclaimer, the term of this patent is extended or adjusted under 35 U.S.C. 154(b) by 1354 days.

This patent is subject to a terminal disclaimer.

(21) Appl. No.: 10/960,537

(22) Filed: Oct. 7, 2004

Related U.S. Application Data

(63) Continuation-in-part of application No. 10/230,439, filed on Aug. 30, 2002, now Pat. No. 6,820,803.

(51) Int. Cl.
*G06K 5/00* (2006.01)

(52) U.S. Cl. ........ 235/380; 235/441; 235/382; 235/492; 235/379; 705/50; 705/64

(58) Field of Classification Search ........... 235/380, 235/441, 381, 382, 492, 379; 705/50, 64
See application file for complete search history.

(56) References Cited

U.S. PATENT DOCUMENTS

| | | | | |
|---|---|---|---|---|
| 5,577,109 | A * | 11/1996 | Stimson et al. | 379/114.2 |
| 6,267,292 | B1 * | 7/2001 | Walker et al. | 235/379 |
| 6,273,335 | B1 * | 8/2001 | Sloan | 235/382 |
| 6,820,803 | B1 * | 11/2004 | Browning et al. | 235/380 |
| 2003/0209608 | A1 * | 11/2003 | Blossom | 235/492 |
| 2004/0011864 | A1 * | 1/2004 | Thompson et al. | 235/380 |

* cited by examiner

*Primary Examiner* — Karl D. Frech
*Assistant Examiner* — Allyson N Trail
(74) *Attorney, Agent, or Firm* — Mark Levy & Associates, PLLC; David L. Banner

(57) ABSTRACT

A cash card system having a pair of financial instruments: a cash instrument and a security instrument, each encoded with a common PIN. The cash instrument, once preloaded with a cash balance, is used to purchase goods and services in cooperation with the pin. The security instrument, also in cooperation with the PIN, is used to recover a cash balance from the cash instrument in the event it is lost or stolen. The cash instrument and the security instrument are never used together to perform any transaction. One or both of the financial instruments may be a smart card having an embedded microchip. One or both of the financial instruments may be a card. The cash card may be a calculator-like structure having a display. In operation, the cash card system provides the anonymity of cash, the safety of traveler's checks and the convenience of a credit card.

19 Claims, No Drawings

CASH CARD SYSTEM

RELATED APPLICATIONS

This application is a Continuation-in-Part of my U.S. patent application Ser. No. 10/230,439, filed Aug. 30, 2002 now U.S. Pat. No. 6,820,803.

FIELD OF THE INVENTION

This invention pertains to a cash card system and, more particularly, to a two-element cash card system providing a substitute for carrying and using currency while affording the user both security and anonymity.

BACKGROUND OF THE INVENTION

Everyone is acutely aware of the drawbacks of using or carrying cash in order to obtain goods and services. Cash is easily lost or stolen. Credit cards are not much better than cash, because they too can be lost, stolen, or counterfeited. One of the advantages of using a credit card is that liability to the individual is often limited to a relatively small, predetermined amount (e.g., $50), but only if the loss is realized and reported promptly. Additionally, losses incurred by the banks are passed on to the cardholders in the form of higher fees and interest payments. It is obvious that a better card transaction system is needed.

Most recently, the use of cash cards has had some success, particularly in Europe. Cash cards, however, have similar problems to other credit card systems.

The present invention provides an improved cash card system substantially eliminating the need for using cash that is safer and more convenient to use.

The cash card system of the current invention uses two cards or elements: a cash card that is related to a second, security card. A magnetic stripe, chip, RFID transceiver, or other machine-readable device on or embedded in the cash card contains the requisite information for making a purchase of goods or services at participating retailers. The security card may be presented at any bank or other participating agency to obtain a refund for the cash contained in a stolen or lost cash card. As used hereinafter, the term card is used to apply to any portable financial instrument usable by the owner thereof to obtain goods or services on a basis equivalent to cash. The physical form may be a credit card-like structure or other small, machine-readable object. Each of the two cards of the present invention may be of a different physical form.

At the time of initial purchase of the cards from a vendor, like a bank, the purchaser is provided with a cash card containing an account number and an encoded or encrypted PIN number selected by the cardholder and known only to him or her. The purchaser selects and pays for the monetary value that is then entered into the cash card system. The card containing the selected PIN number and the account number is then activated as an authorization card for the cash card system.

The user purchases a dollar amount for the cash card, which is electronically loaded therein. This procedure is similar to telephone card systems allowing minutes to be prepurchased. The cash card can also be used to encode the amount used in the course of purchasing goods and services, in another embodiment. The purchaser pays for the electronic cash by cash, check, or electronic transfer of funds. No identification by the purchaser is required to purchase the cash card, thus preserving anonymity. Once the second card is electronically loaded, the user can then use the cash card at any participating sales establishment simply by using the purchaser-assigned PIN to approve purchases (i.e., like a debit card). The user enters the PIN to activate and approve the purchase using the cash card. The approval for the purchase can be verified by subscribing retailers, who swipe the cash card through a card reading machine in order to verify that the PIN number is correct, and to debit the cash needed for the purchase. The amount of the purchase is immediately electronically approved and debited from the cash card. A running balance is maintained for the account held with the issuing bank or agency.

In the event of loss or theft, the cash card cannot be used without entering the proper and correct PIN number assigned by the cardholder at the time of purchase. A refund of the cash remaining in the account may be obtained by presenting the security card to the subscribing issuer and verifying the PIN number contained therein. Therefore, either card is useless without the PIN. People using the cash card system of the invention will be instructed to keep the cards separated upon their person, or to leave the security card at home, in order to foil theft and misappropriation attempts. The PIN number is encrypted and encoded on or in both the security card and the cash card, so it is difficult to determine the PIN without prior knowledge thereof. The security card is used only to retrieve funds from the lost/stolen cash card and in and of itself is useless for obtaining goods or services. This feature keeps others from using the cash card without authorization from the purchaser.

Should the cash card fall into alien hands, its use is prevented by virtue of the need for the correct PIN, which must accompany the use of the card when making a purchase.

In the event of loss of either card, notifying the issuing bank or agency can void each card. A new cash card and/or a new security card with a new PIN can then be issued to the user.

A lost cash card that has been partially used can be replaced with a new card loaded with the remainder of the card fund balance, because a running balance is maintained by the issuing bank or agency. The transaction information at the time of each purchase is recorded so a running balance can be determined after each use of the cash card.

The cash card system of this invention affords persons anonymity and security. The user enjoys the same anonymity and protections of cash purchases without having to carry cash. The user also enjoys the convenience and freedom of card usage (e.g., paying at the gas pump). A user need not apply for credit and is not subject to "hits" on his or her credit records. The government, retailers, or other institutions cannot easily track purchases, card usage, its purposes, or the transaction locations, with respect to a specific individual. However, the individual can keep a running balance of his or her purchases.

Internet purchases are protected because PINs are required when using the card. Because the card system does not require any identification to purchase and/or use the cash card, it further protects a person's identity by maintaining the identifying PIN code separate from the sales transaction. The cash card need not be encoded or encrypted with any personal user information (e.g., name, date of birth, social security number, etc.).

The problem of identity theft is a growing concern for Internet users and consumers. This card system provides electronic purchasing power without revealing any personal information. At the same time, immediate payment to the retailer or seller is ensured.

The cash card system of the invention is designed to clear through an issuer, like a bank, credit union, financial institution, or other commercial agency, where the cash card is purchased. The card may be designed to have either an unlimited or limited life. It can be renewed or "reloaded" upon the payment of additional cash or other transfer of funds. The credit- or debit-type plastic card can comprise a magnetic stripe, RFID device, electronic chip, or other machine readable device. An electronic device (similar to a mini-calculator), displaying the account balance, can also be used as a cash card. The type of card used will depend on the issuer's preference and the amount the purchaser wishes to spend in order to belong to a particular cash card system. Financial institutions will report all cash transactions in excess of $10,000, as required by law. Retailers and sellers will obtain personal information if a purchaser completes a transaction in excess of $10,000, as currently required in regular cash transactions.

The use of traveler's checks is a cashless system similar to the invention. Traveler's checks contain identification numbers identifying the purchaser and the cash amount. Should any one of the checks become lost or stolen, the purchaser can call the issuing bank such as American Express, and obtain a refund. The purchaser is given a receipt with the identification numbers disposed on the checks, and is instructed to maintain the receipt separate from the checks. The system of the present invention incorporates the best features of credit cards, traveler's checks, and cash: the anonymity of cash, the security of traveler's checks, and the convenience of credit and debit cards.

SUMMARY OF THE INVENTION

In accordance with the present invention, a card system is described in which two separate cards or other elements are issued to the user. A magnetic stripe, bar code, RFID device, or chip is disposed on the back of or within each card. As used herein, the term "electronic" is meant to include any optical, magnetic, electrical, mechanical, or electronic means by which information is stored, accessed, or transferred with the use of computer technology. The stripe or other storage medium on or within the cash card contains the requisite information for "clearing" transactions related thereto at any bank or retailer. At the time of the initial purchase, a second card is issued. The second card is a security card containing the cardholder's account number and the selected PIN. This card is for retrieval of funds only, not for purchases. The user purchases goods or services worth a given dollar amount with the cash card at any participating retail establishment, and the cash purchase is debited from the user's account. This procedure is similar to telephone card systems allowing minutes to be pre-purchased.

The purchaser can pay for the electronic funds by cash, check, or electronic transfer. Once the cash card is electronically loaded, the user can then use the cash card in a manner similar to a debit card at any participating sales establishment simply by using the selected PIN to approve purchases. The user enters the PIN to activate and approve the purchase. Purchase of goods or services are validated by a subscribing retailer who swipes or otherwise interrogates the cash card using a card reading machine, verifying the PIN provided by the cardholder. The amount of the purchase is immediately electronically debited from the cardholder's account. A running balance is maintained by the card issuer (bank, credit union, financial institution, etc.).

In an alternate embodiment, the two-card system can be used as a more conventional "smart" card, in which purchases are encoded on the cash card upon use, and the security card provides the same functions hereinbelow described.

In the event of loss of the cash card, it can be replaced by presenting the security card with its identifying PIN code and the user identification or account number contained in the security card. The term "identification," as used herein, is intended to mean non-personal information, but does not necessarily exclude personal information. The PIN is encoded or encrypted within both cards so unauthorized individuals cannot easily determine it. People using the card system will be instructed to keep the security card separated from the cash card, in order to foil theft and misappropriation. Should the cash card fall into alien hands, improper or unauthorized use of the cash card would be prevented by virtue of the need to enter the correct PIN when using the cash card for purchasing goods or services at the participating retailer.

It is an object of the present invention to provide an improved, two element cash card system.

It is another object of this invention to provide a two-element cash card system affording the user a combined increase in security, convenience, and anonymity with the card's use than with any financial transaction system currently in use.

It is a further object of the invention to provide a two-element cash card system wherein each element works independently of the other to perform mutually exclusive functions.

It is an additional object of the invention to provide a two-element cash card system wherein one of the two elements may be a smart card.

It is another object of the invention to provide a two-element cash card system wherein one of the two elements retains information representative of the available case balance.

DESCRIPTION OF THE PREFERRED EMBODIMENT

Generally speaking, the invention features a cash card system having two cards or card-like elements that respectively provide cash and security features. A PIN number is encrypted or encoded on each card. Only the correct PIN number will provide access and validation for transactions using either card. The identification code or account number encoded on the security card is tied to the PIN number. If there is a loss or theft of the cash card, the remaining balance in the account will be reimbursed by presenting the security card to the issuer (bank, financial institution, etc.).

It will be recognized that the cash card system of the invention consists of two independent electronic instruments, neither duplicating the function of the other. In addition, never must the two instruments be used together to perform any function associated with the inventive cash card system. That is, no operable interaction between the instruments is required. Each, however, has a common PIN encoded and electronically associated (i.e., stored) therewith.

The cash card of the two-card system contains electronic cash purchased at a participating bank or agency. The user purchases a dollar amount for the cash card, which is electronically loaded therein. This procedure is similar to telephone card systems allowing minutes to be pre-purchased. The purchaser can pay for the electronic cash by cash, check, or electronic transfer of funds. Alternatively, the cash card can be used as a conventional credit card with no pre-deposited balance. Once the cash card is electronically loaded, in the preferred embodiment, the user can then use it at any participating sales establishment simply by using an assigned PIN to validate purchases. This process is much like using a debit card. The retailer swipes or otherwise reads the cash card containing the encrypted PIN both to validate the PIN and to debit the amount of the purchase. The cardholder types or otherwise enters the PIN to activate or approve a purchase. The amount of the purchase is electronically debited from the account associated with the cash card. The participating bank keeps a running account balance by assigning each purchase an invoice number or transaction code. In alternate embodiments, the cash card is a smart card wherein the cash balance is automatically stored in memory or in the cash card itself. This may be either redundant with or in lieu of storing a running balance at a bank or other financial institution.

In the event of loss or theft, the cash card cannot be used without the PIN number. People using the card system will be instructed to keep the security card separated from the cash card (i.e., leave the security card at home).

Because the pin is typically encrypted or encoded, it is anticipated that it will be extremely difficult to crack. The PIN number is, therefore not readily obtainable by a stranger directly from either card. It is contemplated the PIN for use with the cash card system of this invention would contain an alphanumeric expression only the cardholder or purchaser would know. Alphanumeric expressions, even if restricted to only four digits and letters, present a combination many times more difficult to crack than mere numerical symbols. Symbols, such as an asterisk, can also be part of the PIN.

The cash card system of this invention operates only by use of a PIN. No personal identification information is required for the purchase or use of the cash card. No signature, other than the numerical PIN signature, is required. The retailer is not obliged to accept the cash purchase unless the cardholder has sufficient funds in the encoded account of the cash card.

The cash card system of this invention affords persons anonymity, convenience, and security. The user enjoys the same anonymity and protections of cash purchases without having to carry cash. The user also enjoys the convenience and freedom of card usage, such as paying at the gas pump. A user need not apply for credit, and is not subject to "hits" on his or her credit records. The government, retailers, or other institutions cannot easily track purchases, card usage, its purposes, the transaction locations, or the identity of the user, thus replicating the freedom currently afforded with the use of cash.

Internet purchases are protected because PINs are required when using the card. The card system protects a person's identity because the user does not provide personal information when purchasing the cash card or when transacting business over the Internet.

The card system of the invention is designed to clear through a cardholder's bank, credit union, financial institution, or other commercial agency where the cash card is purchased. The card is designed to have either limited or unlimited life. It can be renewed or "reloaded" upon the payment of cash or transfer of funds. Alternately, the card can be encoded or encrypted so it expires after a designated period of time.

The credit- or debit-type plastic card can comprise a magnetic stripe, RFID device, or electronic chip containing the electronic information. A small electronic device, similar to a mini-calculator, displays the running account balance, and can also be used as a cash card. The type of device used will depend on the issuer's preference and the amount the purchaser wishes to spend in order to belong to a particular cash card system.

A number of types of "cards" are available for use in this system. The cards can be similar in size and configuration to standard debit or credit card. A bar code system can be used with conventional scanners. The card can be in the form of a key chain, bracelet, ring, or mini-card employing a magnetic strip or bar code, RFID transceiver, or other means for electronically reading information therefrom. Alternatively, the card may not be a card at all, but could be any magnetic or electronic device that can be encoded with stored information, and can be scanned or read. For instance, the card can take the form of a credit card-sized calculator able to display one's current available limits. PIN authorization allows the purchase amount to be electronically transferred into the retailer's account.

Small, handheld swipe readers, fixed location swipe systems, and scanning systems (e.g., bar code scanners) are also readily available and in use.

The cash card system is not like a credit card requiring creditworthiness. Thus, people with poor credit can still use the inventive system. It is the equivalent of cash, but with safety, convenience, anonymity, and availability for all users, including those not creditworthy.

In the event of loss of the security card, the cash card can still be used as long as the proper PIN is employed. If the cash card is lost or stolen, the security card can be used to obtain a new cash card or redeem the remaining funds. If a new cash card is issued, a new PIN can be selected by the user. The PIN would be required to verify that the recipient is the proper party to which the new cash card belongs. Future purchases can be made using the replacement card and new PIN.

For security purposes, the cash card and the security card can be taken to any participating network institution (bank, etc.) for selection and/or replacement of a new PIN. Naturally, the existing PIN would be required to make this change.

A partially used, lost cash card can be replaced with a new card having the remainder of the funds if the user can verify his or her PIN number. Replacement is accomplished by presenting the security card to a participating network institution (e.g., bank) and verifying the PIN number encoded therein. The running balance is easily maintained and verified by assigning a transaction number or code to each purchase.

The invention is not limited to one cash card and one security card. Although one security card is issued, multiple cash cards may be issued with the same account and PINS. For instance, a husband and wife may each possess a cash card for the same account, employing identical PINs.

This system will help make possible a cashless society. It is expected to be a boon for banks and other card issuers because it allows them to float large amounts of cash that they will have on hand, but will not have to pay out until the card owner makes a purchase. The amount of money an issuer can make in overnight interest has great potential for commercial establishments.

The cash card system will also benefit retailers. In the event merchandise is returned or a retailer refund is due, the retailer will have the option of refunding cash or reloading the card for the amount of the return or refund. Additionally, retailers will benefit because employee theft will be virtually eliminated, as there will be an electronic transaction recording payment for goods or services, unlike cash transactions.

Other modifications and changes varied to fit particular operating requirements and environments will be apparent to those skilled in the art. The invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A cash card system having a pair of uniquely associated electronic instruments adapted for complementary, non-identical, independent operation, comprising:
   a) a first electronic instrument having a first group of predetermined information including a PIN electronically associated therewith and adapted for performing a financial transaction independently of a second electronic instrument; and
   b) a second electronic instrument—having at least said PIN electronically associated therewith, said second electronic instrument being adapted for performing, independently of said first electronic instrument, at least one of only the transaction types: a security transaction, and a recovery transaction.

2. The cash card system as recited in claim 1, wherein at least one of said first and said second electronic instruments comprises at least one of the information storage devices: a magnetic stripe, RFID device, a microchip, and an optically readable code.

3. The cash card system as recited in claim 2, wherein said PIN comprises at least one of the group: alphanumeric characters, and symbols.

4. The cash card system as recited in claim 3, wherein said alphanumeric characters and symbols are in at least one of the categories: unencrypted plaintext, encrypted, and encoded.

5. The cash card system as recited in claim 2, wherein only said first electronic instruments comprises a cash card.

6. The cash card system as recited in claim 5, wherein said cash card may be replenished.

7. The cash card system as recited in claim 6, wherein said replenishment of said cash card requires the use of said second electronic instrument to perform a security transaction.

8. The cash card system as recited in claim 5, wherein said first group of predetermined information electronically associated with said cash card comprises an available cash balance.

9. The cash card system as recited in claim 8, wherein said available cash balance is altered when said cash card is used to perform a financial transaction.

10. The cash card system as recited in claim 2, wherein said first group of predetermined information comprises clearance information related to an institution issuing said first and said second electronic instruments.

11. The cash card system as recited in claim 1, wherein at least one of said first and said second electronic instruments further comprises an electronic calculator.

12. The cash card system as recited in claim 1, wherein said cash card system has a predetermined expiration date.

13. The cash card system as recited in claim 1, wherein at least one of said first electronic instrument and said second electronic instrument comprises a smart card.

14. The cash card system as recited in claim 1, wherein predetermined information associated with said first electronic instrument excludes any personal information associated with a user thereof.

15. A method of using a cash card system, the steps comprising:
   a) providing a user with two electronic instruments comprising, respectively, a cash instrument and a security instrument;
   b) associating a common PIN with each of said two electronic instruments;
   c) loading said cash instrument with a predetermined value; and
   d) using said cash instrument in cooperation with said PIN and independently of said security instrument to pay for goods or services without need for said security instrument.

16. The method of using a cash card system as recited in claim 15, the steps further comprising:
   e) using said security instrument independently of said cash instrument to recover a balance from said cash instrument when said cash instrument is no longer in the possession of a rightful user thereof.

17. The method of using a cash card system as recited in claim 15, wherein neither said cash instrument, nor said security instrument has a capacity for operative interaction with the other.

18. The method of using a cash card system as recited in claim 15, wherein at least one of said cash and said security instrument comprises at least one of the information storage devices: a magnetic strip, a microchip, and RFID device, and an optically readable code.

19. The method of using a cash card system as recited in claim 15, wherein an available cash balance is stored in said cash instrument, and wherein said using step (d) comprises adjusting said available cash balance.

* * * * *